(12) United States Patent
Park et al.

(10) Patent No.: US 10,325,713 B2
(45) Date of Patent: Jun. 18, 2019

(54) INDUCTOR AND MANUFACTURING METHOD THEREOF

(71) Applicant: SAMSUNG ELECTRO-MECHANICS CO., LTD., Suwon-si, Gyeonggi-do (KR)

(72) Inventors: Jeong Hyun Park, Suwon-si (KR); Sung Tae Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/433,312

(22) Filed: Feb. 15, 2017

(65) Prior Publication Data

US 2017/0309388 A1    Oct. 26, 2017

(30) Foreign Application Priority Data

Apr. 22, 2016 (KR) .................. 10-2016-0049085

(51) Int. Cl.
| | |
|---|---|
| *H01F 5/00* | (2006.01) |
| *H01F 27/28* | (2006.01) |
| *B29C 43/18* | (2006.01) |
| *B29C 43/20* | (2006.01) |
| *B29C 69/00* | (2006.01) |
| *H01F 27/245* | (2006.01) |

(Continued)

(52) U.S. Cl.
CPC ......... *H01F 27/2804* (2013.01); *B29C 43/18* (2013.01); *B29C 43/203* (2013.01); *B29C 69/001* (2013.01); *H01F 27/245* (2013.01); *H01F 27/29* (2013.01); *H01F 41/0233* (2013.01); *H01F 41/041* (2013.01); *B29K 2063/00* (2013.01); *B29K 2077/00* (2013.01); *B29K 2105/16* (2013.01); *B29K 2505/00* (2013.01); *B29K 2995/0008* (2013.01); *B29L 2031/3406* (2013.01); *H01F 2027/2809* (2013.01)

(58) Field of Classification Search
None
See application file for complete search history.

(56) References Cited

U.S. PATENT DOCUMENTS

2014/0184374 A1* 7/2014 Park .................. H01F 27/255
                                                       336/83
2015/0315407 A1* 11/2015 Hyun .................. C08L 21/00
                                                       252/62.54

FOREIGN PATENT DOCUMENTS

| JP | 2014-185256 A | 10/2014 |
|---|---|---|
| KR | 10-2014-0085997 A | 7/2014 |

* cited by examiner

*Primary Examiner* — Ronald Hinson
(74) *Attorney, Agent, or Firm* — Morgan Lewis & Bockius LLP

(57) ABSTRACT

An inductor includes a support having first and second coils formed on first and second surfaces thereof, respectively; a body embedding the support therein so that end portions of the first and second coils are exposed through first and second surfaces of the body opposing each other, and including a first magnetic part disposed in cores of the first and second coils and on upper and lower surfaces of the first and second coils, respectively, and second magnetic parts disposed on upper and lower surfaces of the first magnetic part, respectively; and first and second external electrodes formed on outer surfaces of the body to be electrically connected to the end portions of the first and second coils, respectively. The second magnetic part has a content of a hardening accelerator greater than that of the first magnetic part.

7 Claims, 6 Drawing Sheets

(51) Int. Cl.
*H01F 27/29* (2006.01)
*H01F 41/02* (2006.01)
*H01F 41/04* (2006.01)
*B29K 63/00* (2006.01)
*B29K 77/00* (2006.01)
*B29K 105/16* (2006.01)
*B29K 505/00* (2006.01)
*B29L 31/34* (2006.01)

INDUCTOR AND MANUFACTURING METHOD THEREOF

CROSS-REFERENCE TO RELATED APPLICATION(S)

This application claims the benefit of priority to Korean Patent Application No. 10-2016-0049085, filed on Apr. 22, 2016 in the Korean Intellectual Property Office, the entire disclosure of which is incorporated herein by reference.

TECHNICAL FIELD

The present disclosure relates to an inductor and a manufacturing method thereof.

BACKGROUND

An inductor is a representative passive element configuring an electronic circuit together with a resistor and a capacitor. As miniaturization and thinness of electronic devices have accelerated along with the development of information technology (IT), market demand for small, thin elements has increased, and the capability of implementing high inductance and low direct current resistance characteristics have also been required in inductors.

Among these inductors is a thin film inductor. The thin film inductor is manufactured by forming a coil on a support, stacking a plurality of magnetic sheets on both surfaces of the support, and compressing the stacked magnetic sheets.

The magnetic sheet is formed of a composite of a metal powder or ferrite powder and a resin. In the case of the present application, since the metal powder has high inductance and low direct current resistance as compared to the ferrite powder, the range of uses of metal powders has further enlarged.

A stacked body compressed as described above is manufactured in a form of a bar by optimizing a filling rate using two or more kinds of powders having different particle sizes, filling empty pores with an epoxy resin, and then allowing a hardening process to occur.

When the bar is manufactured as described above, a shape of the bar may be deformed. Under the assumption that the manufactured magnetic sheet is stable in terms of quality, deformation of the bar primarily occurs when a residual solvent contained in the magnetic sheet is volatilized, to thereby be released during drying of the bar, and dry shrinkage of the resin in the magnetic sheet occurs. In addition, the deformation may occur due to hardening shrinkage by a hardening reaction among the resin, a hardener, or a hardening accelerator of the magnetic sheet during the hardening.

Particularly, deformation of the bar due to the hardening shrinkage has been a problem, and when the bar is excessively deformed, the bar is in a state in which a coil disposed in the bar is moved excessively as compared to a desired amount.

Therefore, even though the bar is diced using a compensation value in a dicing process, which is a process subsequent to the hardening process, the possibility that a terminal exposure defect will frequently occur, due to misdicing of a chip, may be large. Therefore, research has been conducted into a technology capable of controlling the hardening shrinkage described above to decrease the deformability of the bar.

SUMMARY

An aspect of the present disclosure may provide an inductor capable of controlling hardening shrinkage to significantly decrease a terminal exposure defect of a coil, and a manufacturing method thereof.

According to an aspect of the present disclosure, an inductor includes a body including a first magnetic part disposed in a core of a coil and on upper and lower surfaces of the coil, and second magnetic parts disposed on upper and lower surfaces of the first magnetic part, respectively. The second magnetic parts have a content of a hardening accelerator greater than that of the first magnetic part.

BRIEF DESCRIPTION OF THE DRAWINGS

The above and other aspects, features, and advantages of the present disclosure will be more clearly understood from the following detailed description when taken in conjunction with the accompanying drawings, in which.

DETAILED DESCRIPTION

Hereinafter, exemplary embodiments of the present disclosure will be described in detail with reference to the accompanying drawings.

Inductor

Figure 1:
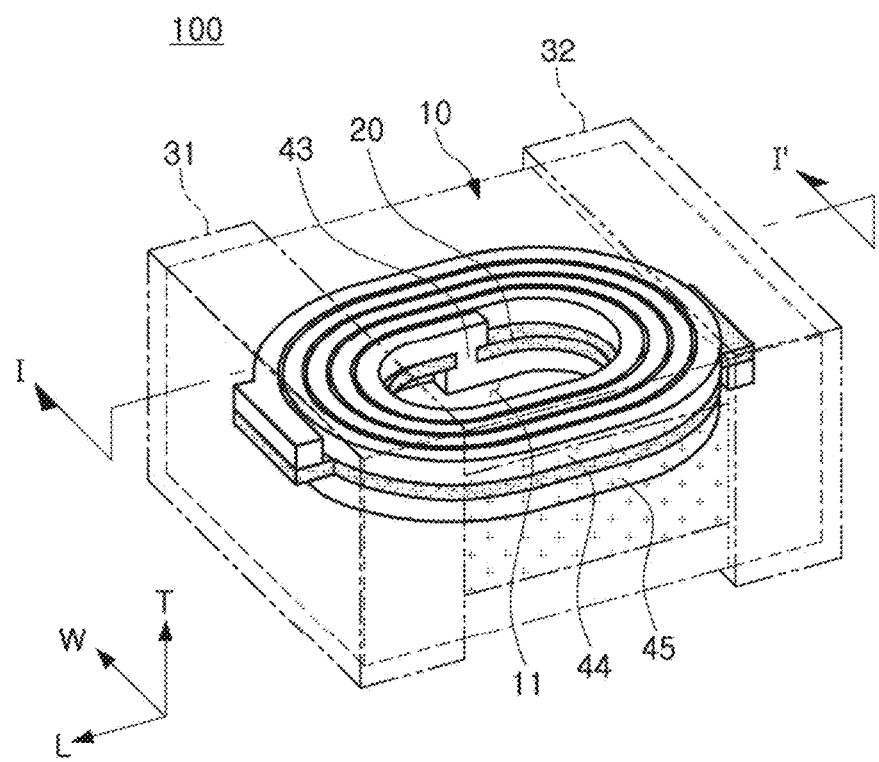
FIG. 1 is a transparent perspective view schematically illustrating an inductor according to an exemplary embodiment in the present disclosure so that a coil is shown.

FIG. 1 is a transparent perspective view schematically illustrating an inductor according to an exemplary embodiment in the present disclosure, so that a coil is shown.

Referring to FIG. 1, an inductor 100 according to the present exemplary embodiment may include a body 10, a support 20 embedded in the body 10 and including first and second coils 41 and 42, and first and second external electrodes 31 and 32 formed on outer surfaces of the body 10 to be electrically connected to end portions of the first and second coils 41 and 42, respectively.

Hereinafter, directions of the body 10 will be defined in order to clearly describe the present exemplary embodiment. L, W and T, illustrated in FIG. 1, refer to a length direction, a width direction, and a thickness direction, respectively. Here, the thickness direction may be the same as a vertical direction.

The body 10 may form an exterior of the inductor 100 and may be formed of a material containing a metal powder, a resin, and a hardener.

Here, if necessary, a small amount of acrylic binder may be further added to the material forming the body 10 as a toughening agent.

The acrylic binder may additionally impart stretchability and tensile force to a sheet in a sheet state, and may form a network, together with an epoxy resin and the hardener at the time of hardening, thereby serving to improve the strength of the completed chip.

The metal powder may be formed of an alloy containing any one or more selected from the group consisting of Fe, Si, Cr, Al, and Ni.

For example, the metal powder may include Fe—Si—B—Cr based amorphous metal particles, but is not necessarily limited thereto as long as the metal powder has a magnetic property.

Further, the metal powder may be contained in a state in which the metal powder is dispersed in the epoxy resin.

The support 20 may be embedded in the body 10, and may be a substrate formed of an insulating material such as a bismaleimide triazine (BT) resin or a photosensitive polymer, but is not limited thereto.

For example, as the substrate, a glass substrate, a ceramic substrate, a semiconductor substrate, a resin substrate such as a FR4 substrate, a polyimide substrate, or the like, in which a problem does not occur at a hardening temperature of the epoxy resin, may be used.

Further, a central portion of the support 20 is penetrated to thereby form a hole, and the hole may be filled with a first magnetic sheet, to be described below, which is a material configuring the body 10, thereby forming a core 11.

When the core 11 is formed as described above, inductance L of the inductor 100 may be improved.

The first coil 41 may be formed on an upper surface of the support 20, the second coil 42 may be formed on a lower surface of the support 20, and the first and second coils 41 and 42 may be electrically connected to each other through a via electrode 43 formed in the support 20 to penetrate through the support 20 in the thickness direction.

In addition, the first and second coils 41 and 42 may be formed in a spiral shape. However, the shape of the first and second coils 41 and 42 according to the present disclosure is not limited thereto. For example, the first and second coils may have a polygonal shape such as a tetragon, a pentagon, a hexagon, or the like, a circular shape, an oval shape, or the like. If necessary, the first and second coils may have an irregular shape. However, in a case in which the first and second coils 41 and 42 have the spiral shape, as in the present exemplary embodiment, an area of the coils may be significantly increased, which is preferable in view of significantly increasing the strength of an induced magnetic field.

In addition, the first and second coils 41 and 42 and the via electrode 43 may contain a metal having excellent conductivity. For example, the metal may be silver (Ag), palladium (Pd), aluminum (Al), nickel (Ni), titanium (Ti), gold (Au), copper (Cu), platinum (Pt), or an alloy thereof.

First and second coating parts 44 and 45 formed of an insulating material may be formed on both surfaces of the support 20 to cover the first and second coils 41 and 42, to thereby serve to insulate the first and second coils 41 and 42 from the body 10, respectively. In this case, the first and second coating parts 44 and 45 may serve to prevent an eddy current loss generated due to conductivity of the metal powder contained in the coils.

Further, a first terminal portion 41a, provided at an end portion of the first coil 41, may be exposed through one end surface of the body 10 in the length direction, and a second terminal portion 42a, provided at an end portion of the second coil 42, may be exposed through the other end surface of the body 10 in the length direction.

In addition, the first and second external electrodes 31 and 32 may be formed on both end portions of the body 10 in the length direction, to contact the first and second terminal portions 41a and 42a of the first and second coils 41 and 42, to thereby be electrically connected thereto, respectively.

Here, the first and second external electrodes 31 and 32 may extend from both surfaces of the body 10 in the length direction to portions of both surfaces thereof in the thickness direction and portions of both surfaces thereof in the width direction, thereby improving adhesion strength, electrical connectivity, and the like.

Further, the first and second external electrodes 31 and 32 may contain a metal having excellent conductivity. For example, the metal may be one of nickel (Ni), copper (Cu), tin (Sn), silver (Ag), and the like, an alloy thereof, or the like.

In addition, nickel plating layers (not illustrated) or tin plating layers (not illustrated) may be further formed on surfaces of the first and second external electrodes 31 and 32.

Figure 2:
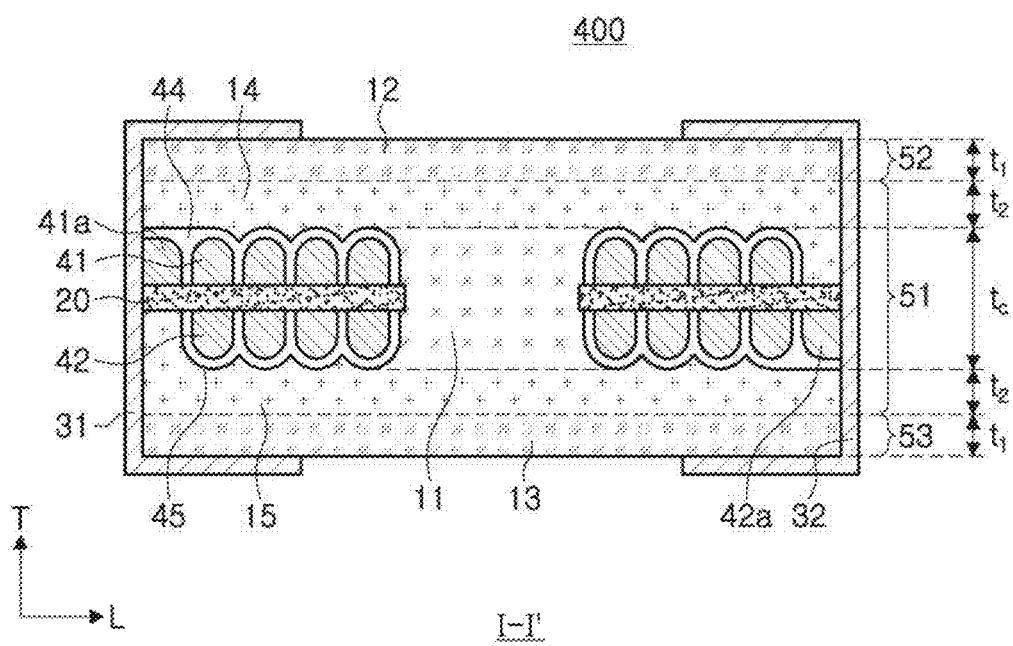
FIG. 2 is a cross-sectional view taken along line I-I' of FIG. 1.

FIG. 2 is a cross-sectional view taken along line I-I' of FIG. 1.

Referring to FIG. 2, the body 10 according to the present exemplary embodiment may include a first magnetic part and a second magnetic part having a hardening speed faster than that of the first magnetic part. In FIG. 2, reference numeral 51 indicates a region corresponding to the first magnetic part of the body in the thickness direction, and reference numerals 52 and 53 indicate regions corresponding to the second magnetic part.

The first magnetic part may include a first upper cover 14 and a first lower cover 15, which are disposed on the core 11 of the first and second coils 41 and 42 and on upper and lower surfaces of the first and second coils 41 and 42, respectively.

Here, a thickness tc of the core 11 may be 350 to 700 μm, and a thickness t2 of each of the first upper cover 14 and the first lower cover 15 may be 500 to 740 μm.

In addition, the first magnetic part may contain the epoxy resin at a content 2.4 to 4.5 parts by weight based on 100 parts by weight of the metal powder, and in the epoxy resin, a ratio (hardener/resin (H/R)) of the hardener to the epoxy resin may be within a range of 0.3 to 0.5.

Here, when a content of the epoxy resin is less than 2.4 wt %, the content of the epoxy resin filled in internal pores is insufficient, such that the metal powder and the epoxy resin may not be uniformly distributed, and binding strength between the metal powder and the epoxy resin may be deteriorated. Therefore, an interfacial adhesion defect of the first and second magnetic parts may occur.

In addition, when the content of the resin is more than 4.5 wt %, a filling property of the metal powder may be deteriorated, such that inductance of the inductor may be deteriorated. In addition, width spread of a bar may occur when compressing the sheets, such that shrinkage of the inductor in a length-width direction may occur, and a thickness of the inductor may be significantly decreased.

Further, when the ratio (H/R) of the hardener to the epoxy resin is less than 0.3, the epoxy resin that does not participate in a hardening process due to a reaction to the hardener may partially remain, and thus un-reacted remaining epoxy resin causes deterioration of strength and binding strength of the inductor, such that the interfacial adhesion defect of the first and second magnetic parts may occur, and defects such as a delamination defect, a chipping defect, and the like, may also occur.

In addition, when the ratio (H/R) of the hardener to the resin is more than 0.5, the bar may be deformed by excessive hardening shrinkage, and a void defect in the bar may occur locally, due to decomposition and volume expansion of the un-reacted hardener that does not participate in the binding with the resin.

The second magnetic part may include a second upper cover 12, formed on an upper surface of the first upper cover 14, and a second lower cover 13, formed on a lower surface of the first lower cover 15.

Here, a thickness t1 of each of the second upper cover 12 and the second lower cover 13 may be 50 to 350 μm.

In addition, the second magnetic part may also contain the epoxy resin at a content of 2.4 to 4.5 parts by weight based on 100 parts by weight of the metal powder, and in the epoxy resin, a ratio (hardener/resin (H/R)) of the hardener to the epoxy resin may be 0.3 to 0.5.

Since the numerical limitations related to the second magnetic part have the same critical meaning as those related to the first magnetic part, described above, hereinafter, a detailed description thereof will be omitted, in order to avoid being redundant.

The second magnetic part may further contain a hardening accelerator for accelerating a hardening reaction or lowering a hardening temperature.

Here, one kind of hardening accelerator may be applied, or if necessary, two or more kinds of hardening accelerators may be applied. Further, in a case in which two or more kinds of hardening accelerators are applied, ratios of the respective hardening accelerators may be the same as each other.

In terms of the composition of the hardening accelerator, at least one of a polyamide based hardening accelerator, a polyamide amine based hardening accelerator, an epoxy adduct type hardening accelerator, a Michael adduct type hardening accelerator, an imidazole type hardening accelerator (2MZ or 2E4MZ), a tertiary amine based hardening accelerator (R3-N), an acid anhydride type hardening accelerator (PA, THPA, MTHPA, MNA), a polyphenol based hardening accelerator, and an aromatic polyamine based hardening accelerator may be used.

As an example, test samples of the comparative examples and inventive examples of the present application were created by preparing an epoxy resin at a content of 2.8 wt %, based on a content of a metal powder, and equally preparing a bisphenol A type epoxy resin and a phenol based hardener at an equivalent ratio of 0.85 or so, but in the 'inventive examples', the imidazole type hardening accelerator was dissolved in methylethylketone (MEK) and added to the test samples in an amount of 0.15 parts by weight, and an amount of 0.17 parts by weight, based on 100 parts by weight of the metal powder. Then, while temperature was raised at the rate of, for example, 70° C./min, a hardening degree of each of the test samples was observed.

In a comparative example, in which the hardening accelerator was not added, a hardening reaction occurred at 171° C. after about 150 seconds, and in an inventive example, in which the hardening accelerator was added, the hardening reaction occurred at 110° C. after about 90 seconds. Therefore, it may be appreciated that the hardening temperature may be decreased by 60° C. or so only by adding the hardening accelerator at a content of 0.15 parts by weight or more.

Figure 3:
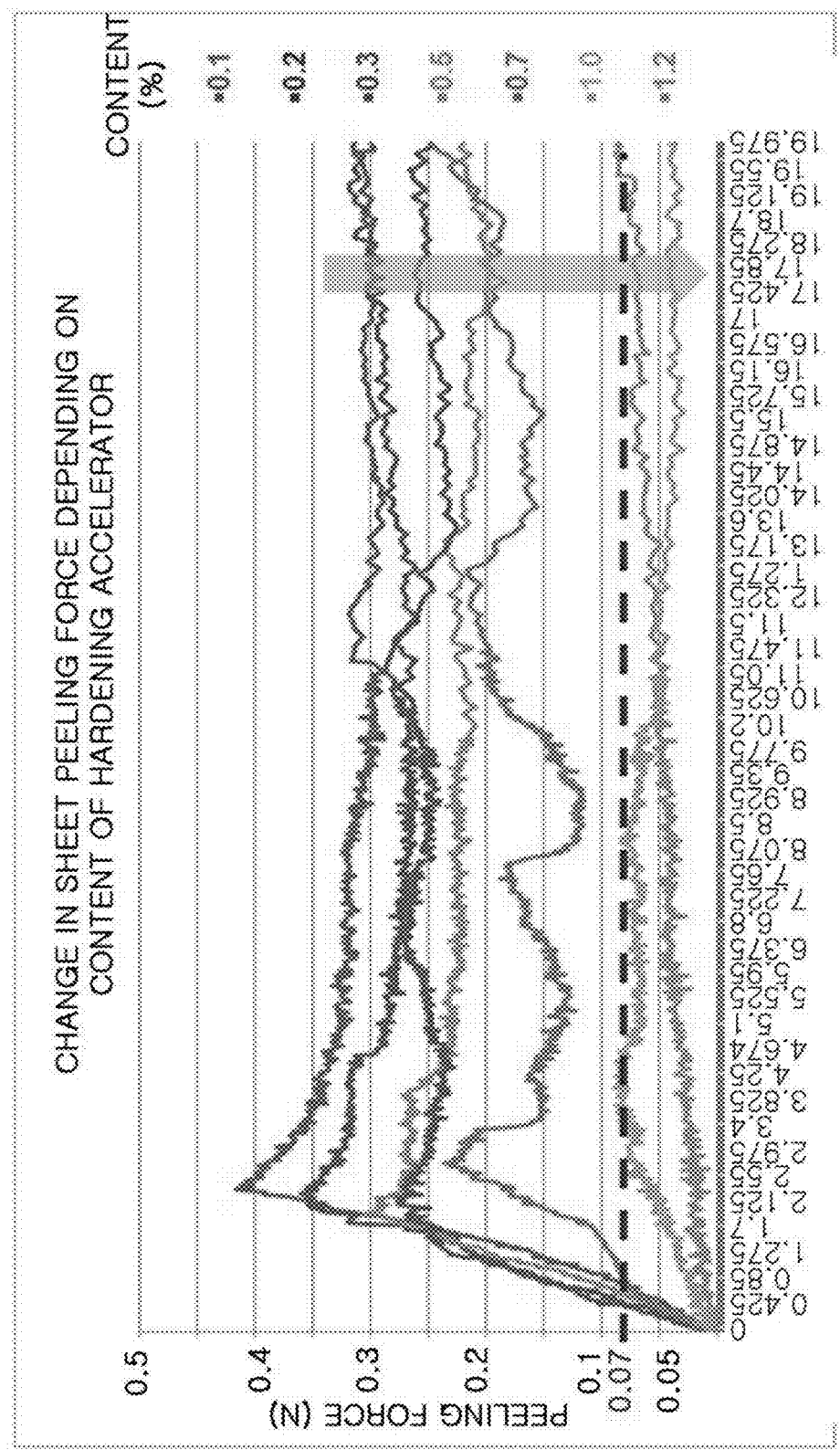
FIG. 3 is a graph illustrating a comparison result of the peeling force of the first and second magnetic sheets depending on a content of a hardening accelerator.

Referring to FIG. 3, it may be appreciated that, in a case of adding the hardening accelerator, a hardening temperature and a hardening time are decreased, but an interfacial adhesion property between the first and second magnetic parts is deteriorated.

When the adhesion property is deteriorated, as described above, a defect may occur due to delamination, in which interfaces between the first and second magnetic parts are detached from each other. Therefore, there is a need to maintain the adhesion property at a predetermined level or higher.

Here, the adhesion property is represented by the peeling force for detaching the sheets from each other after slightly causing the sheets to adhere to each other, and the sheet peeling force measured at room temperature needs to be at least 0.07N or more in order to prevent the delamination as described above.

To this end, the hardening accelerator may be contained at a content of 0.15 parts or more by weight, based on 100 parts by weight of the metal powder.

As another example, both the first and second magnetic parts may contain at least one kind of hardening accelerator at a content of 1.5 parts by weight, respectively, based on 100 parts by weight of the metal powder. In this case, an entire hardening time may be decreased, such that productivity may be improved.

Here, a ratio of a content of the hardening accelerator in the second magnetic part to a content of the hardening accelerator in the first magnetic part may be 1.5 or more to 3.0 or less.

Since a shrinkage behavior of the bar may be controlled only when the second magnetic part is first hardened and then the first magnetic part is hardened, in a case in which the content ratio of the hardening accelerators is less than 1.5, an effect of controlling the shrinkage behavior as described above may be deteriorated.

On the contrary, in a case in which the content ratio is more than 3.0, the hardening reaction of the first magnetic part may be rapidly carried out, such that the adhesion property may be deteriorated, and a delamination possibility, in which the first and second magnetic parts will be separated from each other, may be increased.

Here, one kind of hardening accelerator may be applied, or two or more kinds of hardening accelerators may be applied.

The imidazole or amine based hardening accelerator may be reacted together with the hardener at a high temperature, at which an epoxy ring of the resin starts to be opened, but as modified amine based or urea based hardening accelerators, the polyamide based hardening accelerator, the polyamide amine based hardening accelerator, the epoxy adduct type hardening accelerator, a Michael adduct type hardening accelerator, the imidazole type hardening accelerator (2MZ or 2E4MZ), and the tertiary amine based hardening accelerator (R3-N) promote hardening at a temperature of 100° C. or less, more specifically, 60 to 80° C.

A hardening accelerator promoting the hardening at a temperature of 100° C. or less is referred to as a low-temperature hardening accelerator, and, in a case of simultaneously applying two kinds of hardening accelerators, that is, the low-temperature hardening accelerator and a general hardening accelerator, partial hardening may be performed by stages, such that interfacial adhesion properties between the first upper cover 14 and the second upper cover 12 and between the first lower cover 15 and the second lower cover 13 may be further improved, in addition to a control of hardening shrinkage.

According to another exemplary embodiment in the present disclosure, while the second magnetic part is first hardened, or, in a case in which a filling rate of the metal powder in the first and second magnetic parts is high (80% or more), the interfacial adhesion properties between the first upper cover 14 and the second upper cover 12 and between the first lower cover 15 and the second lower cover 13 may be deteriorated, such that delamination may occur.

That is, when the amount of the metal powder filling the pores is 80% or more, a percentage of the epoxy resin filling the pores may be 20%, such that the content of the added resin may be less than 2.95%, based on the amount of metal powder used. In this case, since an amount of the epoxy resin distributed on the surface of the sheet and participating in interfacial adhesion may also be significantly decreased, the adhesion property may be deteriorated due to different hardening reactions of the first and second magnetic parts, and delamination may occur more frequently.

Therefore, in the case in which the filling rate of the metal powder is high (80% or more) and thus the content of the epoxy resin is less than 2.95%, in order to prevent delamination, as described above, the epoxy resins applied to the first and second magnetic parts may be different from each other, and an epoxy resin having a higher adhesion property and containing a large amount of hardening accelerator may be applied to the second magnetic part.

For example, bisphenol A is in a state in which there is almost no OH group itself, such that compatibility of the resin itself with the metal powder is not good.

However, bisphenol F known to have almost identical characteristics, in terms of a hardening temperature, a hardening time, or the like, has a relatively large number of OH groups as compared to bisphenol A, and has excellent compatibility with the metal powder, thereby improving a sheet adhesion property.

Therefore, as the epoxy resin, bisphenol F may be used in the second magnetic part.

Manufacturing Method of Inductor

Hereinafter, a manufacturing method of an inductor according to another exemplary embodiment in the present disclosure will be described.

First, a first magnetic sheet and a second magnetic sheet having a hardening speed slower than that of the first magnetic sheet may be prepared.

The first and second magnetic sheets may be manufactured in a sheet shape by mixing a magnetic powder, for example, a metal powder, a resin, or a hardener, and organic materials such as a binder, a solvent, and the like, with one another to prepare slurry, and then applying and drying the slurry on carrier films at a thickness of several ten micrometers by a doctor blade method.

Here, hardening rates of the first and second magnetic sheets may be adjusted to be different from each other by allowing the contents of the resin, the hardener, and a hardening accelerator in the first and second magnetic sheets to be different from each other. However, an adjusting method of the hardening rates is not necessarily limited thereto, but any method may be used as long as the hardening rates may be adjusted to be different from each other.

According to another exemplary embodiment in the present disclosure, the first magnetic sheet may contain the epoxy resin at a content of 2.4 to 4.5 parts by weight based on 100 parts by weight of the metal powder, and in the epoxy resin, a ratio (hardener/resin (H/R)) of the hardener to the epoxy resin may be 0.3 to 0.5.

In addition, the second magnetic sheet may also contain the epoxy resin at a content of 2.4 to 4.5 parts by weight based on 100 parts by weight of the metal powder, and in the epoxy resin, a ratio (hardener/resin (H/R)) of the hardener to the epoxy resin may be 0.3 to 0.5.

According to another exemplary embodiment in the present disclosure, the second magnetic sheet may contain at least one of a polyamide based hardening accelerator, a polyamide amine based hardening accelerator, an epoxy adduct type hardening accelerator, a Michael adduct type hardening accelerator, an imidazole type hardening accelerator (2MZ or 2E4MZ), a tertiary amine based hardening accelerator (R3-N), an acid anhydride type hardening accelerator (PA, THPA, MTHPA, MNA), a polyphenol based hardening accelerator, and an aromatic polyamine based hardening accelerator, at a content of 0.15 parts by weight or more, based on 100 parts by weight of the metal powder.

In addition, the second magnetic sheet may contain two or more kinds of hardening accelerators, and one of these hardening accelerators may be a low-temperature hardening accelerator. In addition, the epoxy resin of the second magnetic sheet may be bisphenol F.

According to another exemplary embodiment in the present disclosure, the first and second magnetic sheets may each contain at least one kind of hardening accelerator at a content of 0.15 parts by weight or more, based on 100 parts by weight of the metal powder. In this case, a ratio of a content of the hardening accelerator in the second magnetic sheet to a content of the hardening accelerator in the first magnetic sheet may be 1.5 or more.

In addition, the first and second magnetic sheets may contain two or more kinds of hardening accelerators, and one of these hardening accelerators may be a low-temperature hardening accelerator.

Next, first and second coils 41 and 42 may be formed on both surfaces of a support 20, respectively. In this case, the first and second coils 41 and 42 may be formed, for example, by an electroplating method, but the method of their formation is not limited thereto.

Figure 4:
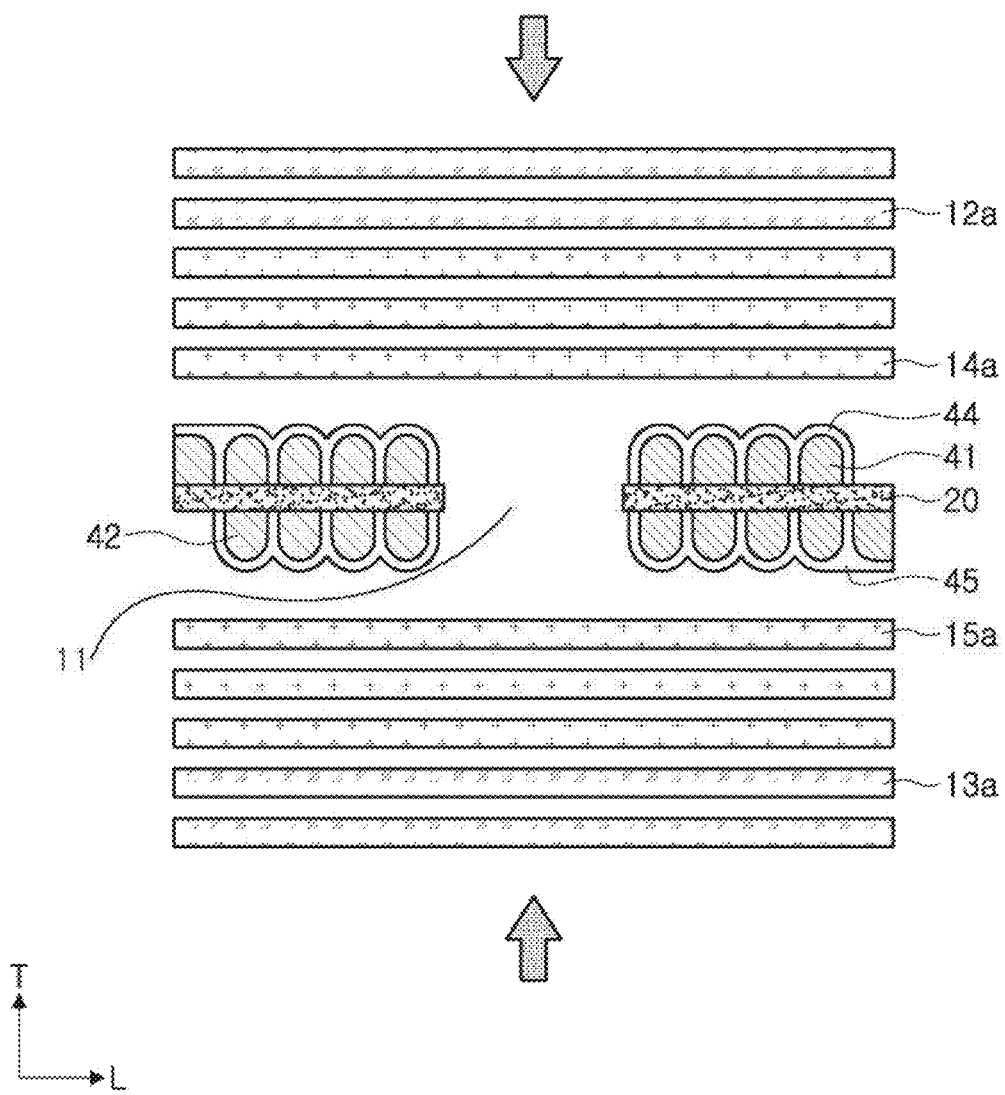
FIG. 4 is a cross-sectional view illustrating a method of stacking a plurality of first and second magnetic sheets on and below a support on which a coil is formed according to another exemplary embodiment in the present disclosure, and of compressing the stacked first and second magnetic sheets.

Then, as illustrated in FIG. 4, a bar having a core 11 may be formed by stacking a plurality of first magnetic sheets on and below the support 20, respectively, stacking a plurality of second magnetic sheets on and below the first magnetic sheets, respectively, and then compressing the stacked first and second magnetic sheets in a vertical direction using a lamination method, an isostatic pressing method, or the like.

For example, in a case of stacking a total of five magnetic sheets on upper and lower surfaces of the support 20, respectively, three first magnetic sheets and two second magnetic sheets may be used. Here, a magnetic sheet having a thickness of 70 to 99 μm may be used.

Figure 5:
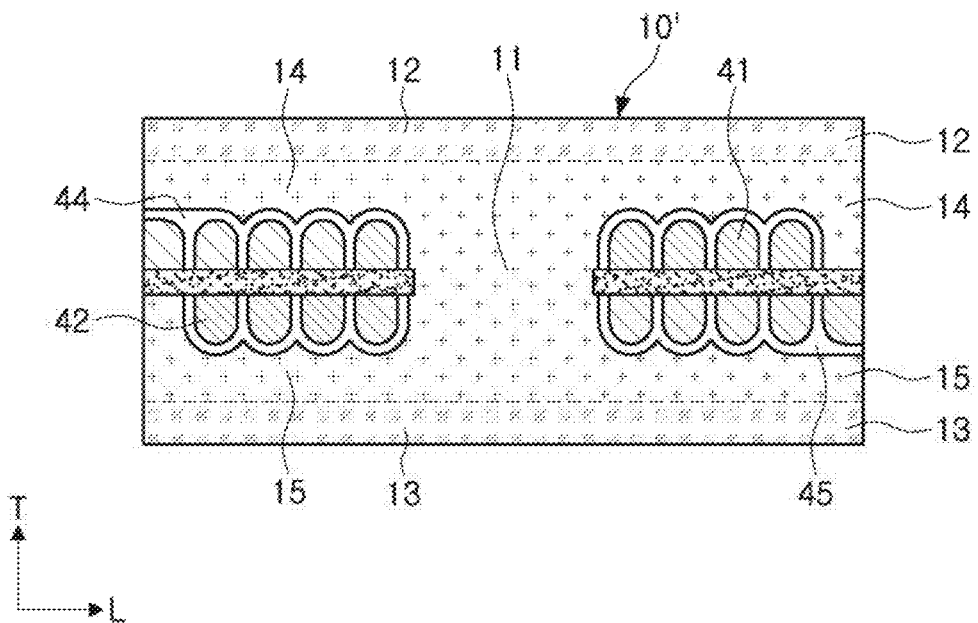
FIG. 5 is a cross-sectional view illustrating a method of stacking and compressing a first magnetic sheet on upper and lower surfaces of a support, and then stacking and compressing a second magnetic sheet thereon, which is a manufacturing method of an inductor according to the present disclosure.
Figure 6:
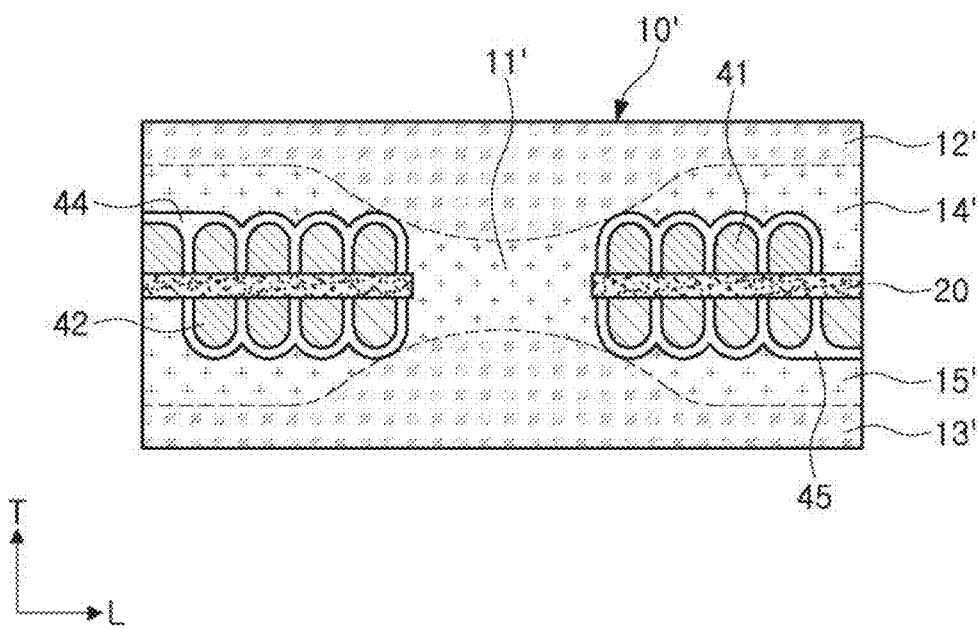
FIG. 6 is a cross-sectional view illustrating a method of sequentially stacking first and second magnetic sheets on upper and lower surfaces of a support, and simultaneously compressing the first and second magnetic sheets, which is another manufacturing method of an inductor according to the present disclosure.

As an example of a compression method of the magnetic sheets, there is a method of stacking and compressing the first magnetic sheets on the upper and lower surfaces of the support 20 and stacking and compressing the second magnetic sheets thereon, as illustrated in FIG. 5, and a method of sequentially stacking the first and second magnetic sheets on the upper and lower surfaces of the support 20 and simultaneously compressing the stacked first and second magnetic sheets, as illustrated in FIG. 6.

In a case of compressing the first magnetic sheets and then compressing the second magnetic sheets, since the first magnetic sheets may be moved and pressed into the coil of the support to be packed thereby, first and second magnetic parts may be parallel with each other, such that hardening shrinkage may be suitably controlled without distortion in a chip during the hardening; but since the first magnetic part is already in a packed state, an interfacial adhesion property between the first and second magnetic parts may be deteriorated.

On the contrary, in the case of simultaneously compressing the first and second magnetic sheets, since the second magnetic sheets may also be pressed into the coil, when an excessive hardening shrinkage of 200 μm or more occurs in the chip in an X-Y axis, distortion of the chip may occur, but the interfacial adhesion property may be increased.

As described above, each of the compression methods has advantages and disadvantages, but since the interfacial adhesion property may be improved, depending on an epoxy resin system (the epoxy resin+the hardener+the hardening accelerator) used in the production of the first and second magnetic sheets, both of the two compression methods may be effective for controlling hardening shrinkage.

Next, the bar may be hardened and diced into individual chips, thereby manufacturing a body 10 having first and second terminal portions 41a and 42a exposed to both surfaces of the body 10 opposing each other.

Thereafter, first and second external electrodes 31 and 32 may be formed on both surfaces of the body 10 opposing each other, to be electrically connected to the first and second terminal portions 41a and 42a, respectively, thereby completing an inductor 100.

Hereinafter, characteristics and actions of an inductor formed of a single material according to the related art, and of the inductor according to the exemplary embodiment in the present disclosure will be described.

According to the related art, in a case in which severe deformation of a bar, which is a form of a body before the body is diced, may be generated, thus increasing a terminal exposure defect at the time of dicing, the terminal exposure defect as described above may be controlled by adjusting a dicing offset value.

However, a particle size distribution of the metal powder forming the bar is several μm to several tens μm, and the powder in a chip has a powder filling rate distribution of about ±3% or so, depending on the change in the particle size distribution, which is also changed according to the LOT number of the powder, such that a percentage occupied by the epoxy resin, except for a volume occupied by the metal powder, may also be changed.

For example, in a case in which the filling rate of the metal powder is 80±30, since the epoxy resin is filled in the internal pores, a volume occupied by the epoxy resin in the chip may be theoretically 20±3%, and a content of the epoxy resin may be adjusted, depending on the filling rate of the metal powder.

In this case, since a hardening shrinkage behavior may be changed depending on a change in a content ratio of the epoxy resin, as described above, bar deformation may be caused, and positions of coils are also not constant, such that there may be a problem in that at the time of dicing, a terminal exposure defect is not constant, but an increase and decrease in the terminal exposure defect may continuously occur.

In addition, the metal powder may be configured by mixing coarse powders, having a D50 of several tens μm, and fine powders, having D50 of several hundreds nm to several μm.

In a case of the coarse metal powder, since the powder rapidly precipitates into a slurry, due to a significantly large particle size and a high density, when a single sheet manufactured using the slurry as described above is applied, the slurry may be nonuniformly dispersed, such that the sheet may have a nonuniform shape.

Therefore, deformability of the bar to which the sheet is applied may be increased, and deformability may also occur in a random mode, such that an exposure defect of the coil may be increased.

On the contrary, in the inductor according to the present exemplary embodiment, hardening shrinkage may be controlled by allowing hardening systems of the sheets stacked on the support to configure the bars (each body) to be different from each other.

In more detail, the sheets may be stacked on and below the support: for example, the sheets may be symmetrically stacked in a form of 3+3, 4+4, or 5+5, depending on the thickness of the sheets. In this case, a sheet having a different epoxy resin hardening system may be stacked in upper and lower outermost portions (the second magnetic part. in the present exemplary embodiment) of the body, such that even though there is a shape problem, as described above in the first magnetic sheet, hardening shrinkage of the bar may be entirely controlled, and at the time of dicing the bar, deformability of the body of the individual chip may be suppressed.

Here, the metal powder applied to each of the sheets configuring the first and second magnetic parts may be the same for each sheet, but the first magnetic sheet, for forming the first magnetic part, configuring the core of the body, the first upper cover, and the first lower cover, may be formed of the resin and the hardener, and the second magnetic sheet, for forming the second magnetic part, configuring the second upper cover and the second lower cover, may be formed of the resin, the hardener, and 0.15% or more of the hardening accelerator.

Here, the hardening accelerator may be present in a content of 0.17%.

Therefore, since the second magnetic sheet may be hardened at a low hardening temperature or within a short hardening time, as compared to the first magnetic sheet, and the first magnetic sheet may be less hardened than the second magnetic sheet, deformability of the body may be further decreased.

Further, when the hardening of the second upper cover and the second lower cover to which the second magnetic sheet is applied is completed, hardening of the core, the first upper cover, and the first lower cover to which the first magnetic sheet is applied may already be in progress.

Therefore, the second magnetic sheet may control hardening shrinkage of the first magnetic sheet, such that deformability of the body due to epoxy hardening may be significantly improved as compared to a case in which the same hardening system is used for all of the sheets.

Figure 7:
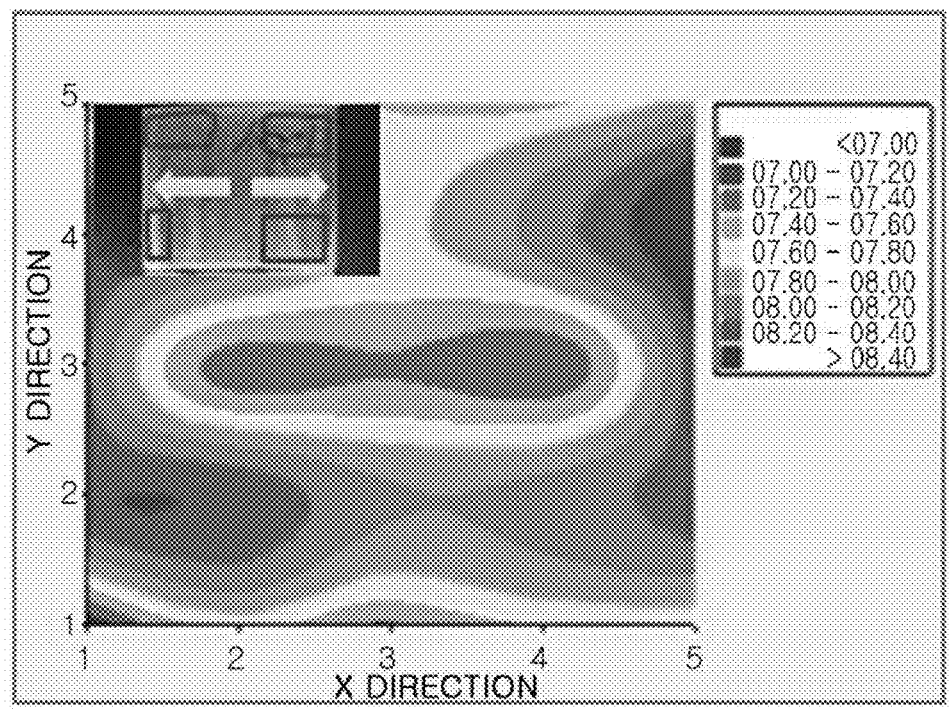
FIG. 7 is a photograph illustrating thickness distribution of a body in an inductor structure according to the related art.

FIG. 7 illustrates a distribution map in which a position of a coil is changed in an X-Y axis in a structure of the inductor according to the related art. Here, the unit of the contour map is μm.

Referring to FIG. 7, the inductor was manufactured by stacking and compressing only five second magnetic sheets on and below a support, without using the first magnetic sheet, and then hardening the compressed second magnetic sheets. A thickness of a bar in the deepest blue region in a central portion was 720 to 740 μm, while a thickness of the bar in left and right yellow green regions was 800 to 820 μm, which indicates that the thickness of the bar was changed by about 100 μm, due to hardening shrinkage in the X-Y axis.

That is, it may be appreciated that, in the inductor according to the related art, in a case of performing the hardening after stacking and compressing only the second magnetic sheets on and below the support, without using the first magnetic sheet, unlike in the case of the inductor according to the present exemplary embodiment, hardening shrinkage may occur excessively.

On the contrary, as in the present exemplary embodiment, in a case of stacking three first magnetic sheets on the upper and lower surfaces of the support, respectively, and primarily compressing the stacked first magnetic sheets, and further stacking two second magnetic sheets on the upper and lower surfaces of the first magnetic sheets, respectively, and secondarily compressing the stacked second magnetic sheets, and then hardening the compressed second magnetic sheets, the hardening of the second magnetic part, formed of the second magnetic sheets, may be completed at a low temperature and within a short time, as compared to the first magnetic part, formed of the first magnetic sheets, and the hardening of the first magnetic part may still be in progress after the second magnetic part has hardened to some degree.

Figure 8:
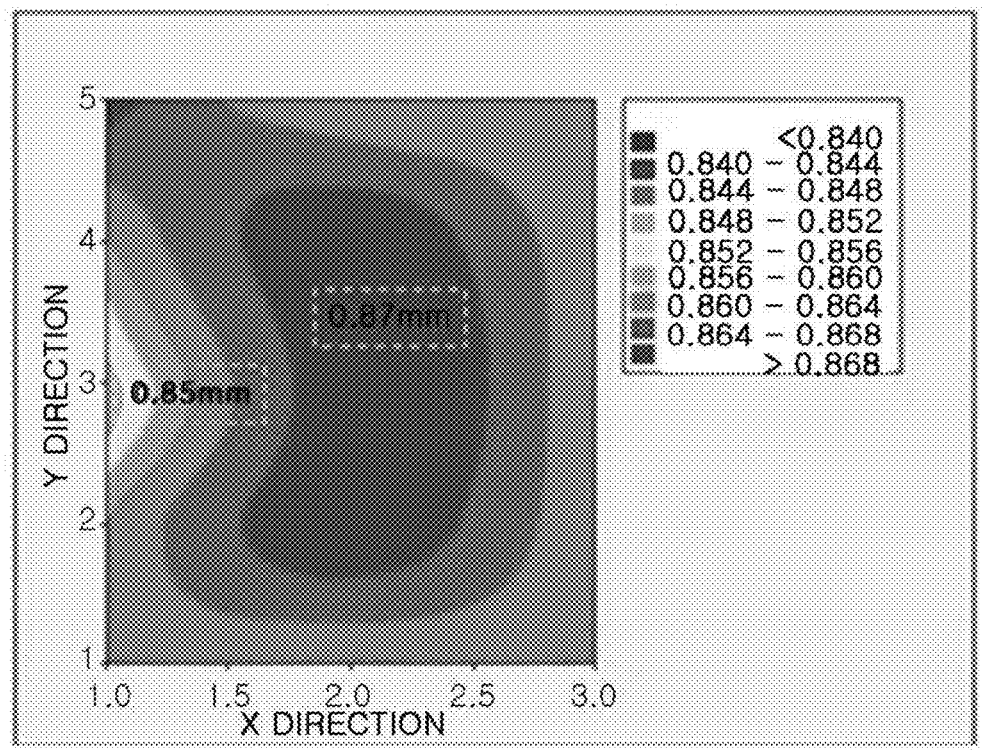
FIG. 8 is a photograph illustrating thickness distribution of a body manufactured by the manufacturing method of FIG. 5.

Therefore, as illustrated in FIG. 8, it may be appreciated that thickness distribution depending on a region, caused by hardening shrinkage of the bar, is not large and may be uniformly controlled by entirely controlling hardening shrinkage of the bar so that deformability is within 0.02 mm (20 μm).

Figure 9:
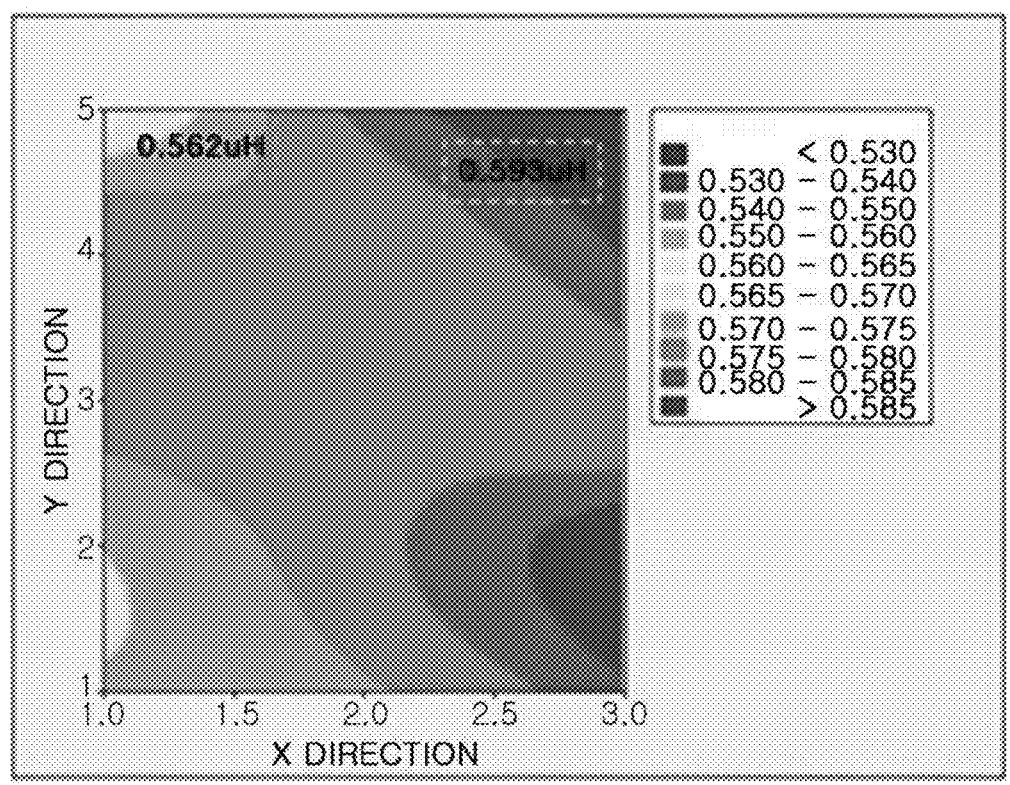
FIG. 9 is a photograph illustrating inductance distribution of the body manufactured by the manufacturing method of FIG. 5.

Further, as illustrated in FIG. 9, it may be appreciated that when deformability is controlled as described above, an inductance deviation of the bar may be decreased from 0.593 uH to 0.562 uH, such that the inductance deviation may be relatively decreased.

EXPERIMENTAL EXAMPLE

Table 1, which follows, illustrates shrinkage deformation rates in a length-width direction at the time of hardening bodies and the presence or absence of an interfacial adhesion defect of first and second magnetic parts depending on contents of an epoxy resin and a hardener in first and second magnetic sheets.

Here, a filling rate of a metal powder in the first and second magnetic sheets was 80±5 wt %, and the first and second magnetic sheets were each manufactured at a thickness of 90±5 μm.

TABLE 1

| No. | Content (Parts by Weight) of Epoxy Resin Based on 100 parts by weight of a Metal Powder in First Magnetic Sheet | Content (Parts by Weight) of Epoxy Resin Based on 100 parts by weight of a Metal Powder in Second Magnetic Sheet | Shrinkage Deformation (μm) in Length-Width direction | Interfacial Adhesion |
|---|---|---|---|---|
| 1 | 2.30 | 2.40 | — | Poor |
| 2 | 2.30 | 3.00 | — | Poor |
| 3 | 2.30 | 4.60 | 650 | Poor |
| 4 | 2.40 | 2.50 | 300 | — |
| 5 | 3.00 | 3.00 | 200 | — |
| 6 | 3.40 | 3.50 | 250 | — |
| 7 | 3.40 | 2.40 | — | — |
| 8 | 3.40 | 4.60 | 800 | — |
| 9 | 4.00 | 4.00 | 150 | — |
| 10 | 4.50 | 4.50 | 450 | — |
| 11 | 4.60 | 2.30 | 650 | Poor |
| 12 | 4.60 | 3.00 | 700 | — |
| 13 | 4.60 | 4.60 | 1000 | — |

In all samples of Table 1, in both of the epoxy resins of the first and second magnetic sheets, a ratio of a resin hardener to the resin was set to 0.4.

Referring to Table 1, in samples 1 to 3, in which the content of the epoxy resin based on 100 parts by weight of the metal powder in the first magnetic sheet was less than 2.4 parts by weight, an interfacial adhesion defect occurred.

Further, in samples 11 to 13, in which the content of the epoxy resin based on 100 parts by weight of the metal powder in the first magnetic sheet was more than 4.5 parts by weight, excessive shrinkage deformation (650 μm or more) in the length-width direction occurred.

Furthermore, in samples 3 and 8, in which the content of the epoxy resin based on 100 parts by weight of the metal powder in the second magnetic sheet was more than 4.5 parts by weight, excessive shrinkage deformation (650 μm or more) in the length-width direction occurred.

Here, in sample 13, in which the contents of the epoxy resin based on 100 parts by weight of the metal powder in the first and second magnetic sheets were more than 4.5 parts by weight, significantly excessive shrinkage deformation (1000 μm) in the length-width direction occurred.

Further, in sample 11, in which the content of the epoxy resin based on 100 parts by weight of the metal powder in the second magnetic sheet was less than 2.4 parts by weight, an interfacial adhesion defect occurred.

Therefore, it may be confirmed that when at least one of the contents of the epoxy resin based on 100 parts by weight of the metal powder in the first and second magnetic sheets was more than 4.5 parts by weight, excessive shrinkage deformation (more than 500 μm) in the length-width direction occurred, and when at least one of the contents of the epoxy resin based on the metal powder in the first and second magnetic sheets was less than 2.4 parts, the interfacial adhesion defect occurred.

Table 2, which follows, illustrates shrinkage deformation rates in a length-width direction at the time of hardening bodies, the presence or absence of a void defect, and the presence or absence of an interfacial adhesion defect of first and second magnetic parts depending on ratios of a hardener to the resin in the epoxy resins of the first and second magnetic sheets.

Here, a filling rate of a metal powder in the first and second magnetic sheets was 80±5 wt %, and the first and second magnetic sheets were each manufactured at a thickness of 90±5 μm.

TABLE 2

| No. | Ratio (Hardener/Resin) of Hardener to Resin In Epoxy Resins of First Magnetic Sheet | Ratio (Hardener/Resin) of Hardener to Resin In Epoxy Resins of second Magnetic Sheet | Shrinkage Deformation (μm) in Length-Width direction | Void | Interfacial Adhesion |
|---|---|---|---|---|---|
| 1 | 0.2 | 0.2 | 400 | No | Poor |
| 2 | 0.2 | 0.4 | 200 | No | Poor |
| 3 | 0.2 | 0.6 | 650 | Present | Poor |
| 4 | 0.3 | 0.3 | 300 | No | — |
| 5 | 0.4 | 0.2 | 350 | No | Poor |
| 6 | 0.4 | 0.4 | 400 | No | — |
| 7 | 0.4 | 0.6 | 700 | Present | Poor |
| 8 | 0.5 | 0.5 | 400 | No | — |
| 9 | 0.6 | 0.2 | 650 | Present | Poor |
| 10 | 0.6 | 0.4 | 700 | Present | Poor |
| 11 | 0.6 | 0.6 | 900 | Present | — |

In all samples of Table 2, contents of the epoxy resin based on 100 parts by weight of the metal powder in the first and second magnetic sheets were set to 3.5 parts by weight.

Referring to Table 2, in samples 1 to 3, in which the ratio of the hardener to the resin in the epoxy resin of the first magnetic sheet was less than 0.3, an interfacial adhesion defect occurred.

Further, in samples 9 to 11, in which the ratio of the hardener to the resin in the epoxy resin of the first magnetic sheet was more than 0.5, excessive shrinkage deformation (650 μm or more) in the length-width direction occurred, and voids were observed.

Furthermore, in samples 3 and 7, in which the ratio of the hardener to the resin in the epoxy resin of the second magnetic sheet was more than 0.5, excessive shrinkage deformation (650 μm or more) in the length-width direction occurred, and voids were observed.

In addition, in sample 11, in which both of the ratios of the hardener to the resin in the epoxy resins of the first and second magnetic sheets were more than 0.5, significantly excessive shrinkage deformation (900 μm) in the length-width direction occurred, and voids were observed.

Further, in sample 5, in which the content ratio of the hardener to the resin in the epoxy resin of the second magnetic sheet was less than 0.3, an interfacial adhesion defect occurred.

Therefore, it may be confirmed that when at least one of the ratios of the hardener to the resin in the epoxy resins of the first and second magnetic sheets was more than 0.5, excessive shrinkage deformation (more than 500 μm) in the length-width direction occurred, and voids were observed, and when at least one of the ratios of the hardener to the resin in the epoxy resins of the first and second magnetic sheets was less than 0.3, the interfacial adhesion defect occurred.

As set forth above, according to exemplary embodiments in the present disclosure, the terminal exposure defect of the coil occurring in the dicing may be significantly decreased by controlling the hardening shrinkage at the time of manufacturing the inductor, to suppress distortion of the coil.

While exemplary embodiments have been shown and described above, it will be apparent to those skilled in the art that modifications and variations could be made without departing from the scope of the present invention as defined by the appended claims.

What is claimed is:

1. An inductor comprising: a support having first and second coils formed on first and second surfaces thereof, respectively; a body embedding the support therein so that end portions of the first and second coils are exposed through first and second surfaces of the body opposing each other, and including a first magnetic part disposed in cores of the first and second coils and on upper and lower surfaces of the first and second coils, respectively, and second magnetic parts disposed on upper and lower surfaces of the first magnetic part, respectively; and first and second external electrodes formed on outer surfaces of the body to be electrically connected to the end portions of the first and second coils, respectively, wherein each of the first and second magnetic parts consists essentially of a metal powder, a resin, a hardening accelerator, a solvent and an acrylic binder, the second magnetic part has a content of the hardening accelerator greater than that of the first magnetic part, and the second magnetic part contains the hardening accelerator at a content of 0.15 parts by weight or more based on 100 parts by weight of a metal powder.

2. The inductor of claim 1, wherein each of the first and second magnetic parts contains an epoxy resin at a content of 2.4 to 4.5 parts by weight based on 100 parts by weight of a metal powder, and in the epoxy resin, a ratio of a hardener to the epoxy resin is within a range of 0.3 to 0.5.

3. The inductor of claim 2, wherein the epoxy resin of the second magnetic part is bisphenol F.

4. The inductor of claim 1, wherein the second magnetic part contains at least one of a polyamide based hardening accelerator, a polyamide amine based hardening accelerator, an epoxy adduct type hardening accelerator, a Michael adduct type hardening accelerator, an imidazole type hardening accelerator (2MZ or 2E4MZ), a tertiary amine based hardening accelerator (R3-N), an acid anhydride type hardening accelerator (PA, THPA, MTHPA, MNA), a polyphenol based hardening accelerator, and an aromatic polyamine based hardening accelerator.

5. The inductor of claim 4, wherein the second magnetic part contains two or more hardening accelerators, one of the hardening accelerators being a low-temperature hardening accelerator.

6. The inductor of claim 1, wherein each of the first and second magnetic parts contains at least one of a polyamide based hardening accelerator, a polyamide amine based hardening accelerator, an epoxy adduct type hardening accelerator, a Michael adduct type hardening accelerator, an imidazole type hardening accelerator (2MZ or 2E4MZ), a tertiary amine based hardening accelerator (R3-N), an acid anhydride type hardening accelerator (PA, THPA, MTHPA, MNA), a polyphenol based hardening accelerator, and an aromatic polyamine based hardening accelerator at a content of 0.15 parts by weight or more based on 100 parts by weight of a metal powder, and a ratio of the content of the hardening accelerator in the second magnetic part to the content of the hardening accelerator in the first magnetic part is in a range from equal to or more than 1.5 to equal to or less than 3.0.

7. The inductor of claim 6, wherein each of the first and second magnetic parts contains two or more hardening accelerators, one of the hardening accelerators being a low-temperature hardening accelerator.

* * * * *